United States Patent Office 3,376,330
Patented Apr. 2, 1968

3,376,330
ALKOXYALKYLMERCURY, ALKYLMERCURY CITRATES
Gustav Thomann, Riehen, Basel-Stadt, Switzerland, and Fred Kuhnen, Weil am Rhein, Germany, assignors to Sandoz Ltd. (also known as Sandoz A.G.), Basel, Switzerland
No Drawing. Filed Nov. 18, 1964, Ser. No. 412,219
Claims priority, application Switzerland, Nov. 25, 1963, 14,383/63
3 Claims. (Cl. 260—432)

ABSTRACT OF THE DISCLOSURE

Compounds of the type of e.g.

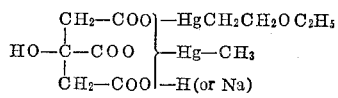

are useful as active fungicidal compounds in steeping agents for the treatment of seeds.

---

The present invention relates to fungicidal and bactericidal mercury compounds and to a process for the production thereof.

Alkoxyalkylmercury compounds are known which are very suitable active substances for steeping seed. For this purpose steeping is effected by treating the seed either with a pulverulent mixture of active substances and a suitable diluent or with a solution or suspension of the active substance. In the case of active substances having a low volatility such that their fungicidal effect can only be realized by direct contact with the fungi or bacteria to be destroyed, it is necessary to ensure as much as possible complete distribution of the steeping agent in the seed by mechanical mixing. Seed treated in this way remains protected against attack by fungi or bacteria even after prolonged storage.

It is likewise known to steep seed with liquid or solid preparations which contain certain alkylmercury compounds as active substances. Since these are relatively volatile compounds having a high vapour pressure, a uniform steeping effect is obtained even on incomplete mixing of the seed with the steeping agent. Steeping with volatile active substances, however, has the disadvantage that corn treated therewith becomes again prone to attack by fungi and bacteria even after a short storage period.

It has now been found that the advantage of the alkoxyalkylmercury compounds can be combined with that of the alkylmercury compounds by using a new type of compound as will be explained hereafter.

The present invention provides compounds of the formula.

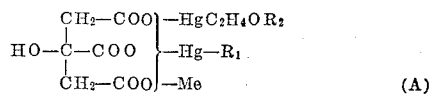

wherein:
each of $R_1$ and $R_2$ represents a lower alkyl radical, and Me represents a member of the class consisting of hydrogen atoms and cations.

The term "lower" as used herein designates alkyl radicals of from 1 to 4 carbon atoms. The preferred lower alkyl radicals are methyl and ethyl radicals, with n-propyl and isopropyl next best.

The compounds (A) contain in each molecule a radical of a volatile compound having a relatively high vapour pressure and also of a non-volatile one having a relatively low vapour pressure so that they provide at the same time efficient and prolonged protection against fungi and bacteria; this is believed to be due to the volatility of the lower alkylmercury component and to the stability to prolonged storage afforded by the lower alkoxyethylmercury component.

The compounds of the present invention may be produced by reacting 1 mol of citric acid with 1 mol each of a compound of Formula I $$R_1-Hg-X \qquad (I)$$

and of a compound of Formula II $$R_1OCH_2CH_2-Hg-X \qquad (II)$$

wherein:

$R_1$ and $R_2$ have the above significance and
X represents a hydroxyl radical or the residue of an acid capable of being replaced with citric acid under the reaction conditions.

Although the reaction may be carried out in one step, e.g. by mixing (i) 1 mol of citric acid, (ii) 1 mol of a compound of Formula I and (iii) 1 mol of a compound of Formula II and evaporating to dryness, it can be conveniently effected in two stages, i.e. citric acid is first reacted with a compound I and the resulting reaction product is then reacted with a compound II or vice versa. In the one stage reaction a relatively small amount of a di(lower alkyl mercury) citrate and of a di(lower alkoxyethylmercury) citrate is produced, though the compound (A) is produced in substantial amount, so that the resulting mixture is almost as efficient as the product produced by a two stage reaction.

Suitable values for the radicals $R_1$ and $R_2$ in Formula A are, for example, methyl, ethyl, isopropyl and n-butyl.

When the radical X in Formulae I and II is a residue of a carboxylic acid, it is advantageously the residue of an acid having a strength less than that of citric acid, preferably of a volatile aliphatic acid with 1 to 4 carbon atoms e.g., of acetic or propionic acid.

When the radical Me in Formulae A, I and II is a cation, suitable values are, for example, an alkali metal cation or an alkaline earth metal cation (e.g. sodium, potassium, calcium or magnesium) or an ammonium cation or a cation of an organic amine, preferably of a water-soluble amine, (e.g. methylamine, dimethylamine, trimethylamine, ethylamine, mono-, di- or tri-ethanolamine, a propanolamine or morpholine).

Advantageously the reaction is effected in aqueous solution. Subsequently the pH value may advantageously be adjusted to about 6.5, a favourable value from the physiological point of view, by the addition of the necessary amount of an alkali metal or alkaline earth metal hydroxide, preferably in the form of an aqueous solution or suspension, or of ammonia or of an amine, preferably in aqueous solution.

Alkylmercury hydroxides or acetates may be used as compound I; examples of compounds II are alkoxyethylmercury hydroxides or acetates.

The compounds of Formula A above may, for example, be obtained in the pure state by evaporating their aqueous solutions; in general, they are then obtained in the form of white, very hygroscopic powders.

For their use as steeping agents for seed they may be present either in the liquid form, the solvent being water or a mixture of water with water soluble organic solvents, e.g. alcohols, ketones, etc., or in pulverulent form obtained by distribution on inert solid carriers, for example talcum, hydrated sodium silicoaluminate, etc.

The compounds of Formula A above have the unexpected advantage over mixtures of compounds of Formulae I and II of being less harmful to shoots than are these mixtures.

The following examples illustrate the invention without limiting it.

EXAMPLE 1

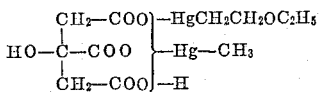

27.4 g. of methylmercury acetate (0.1 mol) and 19.2 g. of citric acid (0.1 mol) are dissolved in 100 ml. of water and evaporated to dryness at 60–70° C./20 mm. of Hg. A residue weighing 40.6 g. remains. The resulting methylmercury citrate is dissolved in water and an aqueous solution of 29 g. of ethoxyethylmercury hydroxide is added while stirring, whereupon the reaction mixture is evaporated at 60–70° C./20 mm. of Hg until the weight remains constant.

The residue is a hard, slightly greenish hygroscopic mass.

*Analysis.*—Hg (calculated), 59.05%; (found), 59.48%.

EXAMPLE 2

An aqueous solution containing 14.5 g. of ethoxyethylmercury hydroxide is added to an aqueous solution containing 20.3 g. of methylmercury citrate and, the pH value of the resulting mixture is brought to 6.8 by adding sodium hydroxide solution; evaporation to dryness is then effected in a vacuum at 70° C./20 mm. of Hg. The residue is pulverized; it is present in the form of an almost white powder which decomposes at 130° C.

*Analysis.* — Hg (calculated [1]), 57.2%; (found), 56.59%. Na (found), 2.08%. $H_2O$ (found), 2.54%.

The chemical structure of the material corresponds to that of the formula stated in Example 1, but the free COOH radical is partly neutralized.

---
[1] The calculation is based on the formula:

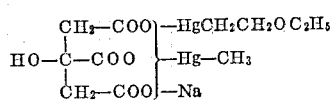

We claim:
1. A compound of the formula

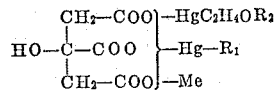

wherein:
each of $R_1$ and $R_2$ represents a lower alkyl radical, and
Me represents a member selected from the class consisting of H, alkali metal, alkaline earth metal, ammonium and organic amine cations.

2. A compound of formula

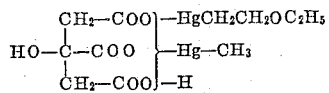

3. A compound of formula

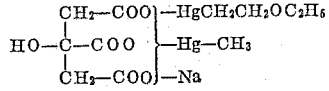

References Cited

UNITED STATES PATENTS 2,114,012  4/1938  Anderson _____ 260—414

FOREIGN PATENTS 427,974  5/1935  Great Britain.

TOBIAS E. LEVOW, *Primary Examiner.*

HELEN M. S. SNEED, *Assistant Examiner.*